United States Patent [19]
Yonezawa

[11] Patent Number: 6,104,681
[45] Date of Patent: Aug. 15, 2000

[54] DISK APPARATUS

[75] Inventor: Minoru Yonezawa, Tokyo, Japan

[73] Assignee: Kabushiki Kaisha Toshiba, Kawasaki, Japan

[21] Appl. No.: 09/042,082

[22] Filed: Mar. 13, 1998

[30] Foreign Application Priority Data

Mar. 14, 1997  [JP]  Japan .................................. 9-061572

[51] Int. Cl.[7] ..................................................... G11B 7/00
[52] U.S. Cl. .................................. 369/44.34; 369/44.25; 369/44.32; 369/32
[58] Field of Search ........................... 369/44.27, 44.28, 369/44.29, 32, 44.34, 44.32, 44.25

[56] References Cited

U.S. PATENT DOCUMENTS

| | | | |
|---|---|---|---|
| 4,562,562 | 12/1985 | Moriya et al. | 369/44.28 |
| 4,866,690 | 9/1989 | Tamaru . | |
| 5,048,001 | 9/1991 | Moriya et al. | 369/44.28 |
| 5,065,383 | 11/1991 | Tateishi et al. | 369/44.28 |
| 5,398,221 | 3/1995 | Ogawa | 369/44.28 |
| 5,475,663 | 12/1995 | Ogino | 369/44.28 |
| 5,477,513 | 12/1995 | Onodera et al. | 369/44.28 |

*Primary Examiner*—Nabil Hindi
*Attorney, Agent, or Firm*—Finnegan, Henderson, Farabow, Garrett & Dunner, L.L.P.

[57] ABSTRACT

In the disk apparatus of the present invention, a head unit records and/or reproduces information on the disk while the disk is rotating. An actuator activates a positioning of the head at target position of the disk. An error detection section detects an error signal between the target position and a position of the head unit activated by the actuator. A tracking compensation section outputs a driving signal of the actuator in order according to the error signal. A decision section decides whether an absolute value of a difference between the driving signals is above a threshold. A predetermined value output section outputs a predetermined value to compensate the driving signal if the absolute value of the difference is above the threshold. An actuator driving section drives the actuator according to the driving signal and the predetermined value.

9 Claims, 17 Drawing Sheets

DISK APPARATUS

FIELD OF THE INVENTION

The present invention relates to a disk apparatus for suitably actuating a head unit to a target track on a disk to record and/or reproduce information.

BACKGROUND OF THE INVENTION

In the optical disk apparatus, an optical beam spot is formed at a position of the target track on the optical disk to follow the track. In this case, an actuator to move an optical head along track cross direction is driven. This actuator moves the optical head from most inner track to most outer track on the optical disk. Positioning of the optical head is required by accuracy within "1/20" track width because of recording and/or reproducing information.

Recently, in order to realize the positioning of the optical head, a linear actuator for positioning of a large displacement is used. The linear actuator is supported to move along track cross direction by a guide shaft. In case the positioning of high accuracy is required, a coarse actuator for positioning of the large displacement and a fine actuator for positioning of a fine displacement are cooperatively used. However, inspite of cooperative use of both actuators, if the friction between the actuator and the guide shaft is generated, the positioning is not accurately executed.

FIG. 1 is a block diagram of the disk apparatus (tracking control apparatus) according to a prior art. In the tracking method of the prior art, an error between a position of the target track and a position of the optical beam spot is optically detected as a tracking error signal and used as an error signal. In FIG. 1, the optical beam spot is reflected on the optical disk. This reflection light is detected by a two split photo detector 12 and converted to an electric signal. The tracking error signal is amplified and filtered by an adder-subtractor amplifier circuit 13 and converted to a driving signal by a tracking compensation circuit 14. The driving signal is supplied to a coarse actuator driving circuit 15 to drive a coarse actuator 16 and a fine actuator driving circuit 17 to drive a fine actuator 18. These actuators are driven to compensate the tracking error. As a result, the optical beam spot follows the target track. In this case, the tracking compensation circuit 14 executes filtering calculation and gain multiplication. In general, high frequency elements are mainly inputted to the fine actuator driving circuit 17 and low frequency elements are inputted to the coarse actuator driving circuit 15. The coarse actuator 16 is supported by a bearing for the guide shaft. A friction generated between the bearing and the guide shaft disturbs the tracking of the optical head 4 to follow the target track. In order to avoid this problem, a roll bearing, whose friction is small is often used. However, a thickness of this part is large because rolling balls are existed between the guide shaft and the bearing. Furthermore, location of the bearing is limited because support force generated by the bearing is equally distributed.

As another method to solve this problem, a slide bearing is used as the bearing part. By using the slide bearing, a design flexibility is high and an element cost is cheap because the optical head and the bearing are formed as one unit. Furthermore, a size of the actuator driving system becomes thin because a distance between the guide shaft and the bearing is short. However, the friction between the guide shaft and the slide bearing is largely generated and the positioning error is also large because of the friction. Concretely speaking, a movement of the actuator is stopped by the friction and continuously stopped for a predetermined time till a force larger than the friction is supplied. Therefore, the error between the target track and the optical head continuously increases during the predetermined time. If the static friction is large, increase quantity of the error is also large because the predetermined time becomes long.

In case of actual positioning, a tracking servo system is comprised of filtering operation of the tracking compensation circuit 14 in order to suppress a disk eccentricity. If the actuator used for tracking control is affected by a large friction, the disk eccentricity is sufficiently suppressed as shown in FIG. 2. However, if the increase quantity of the error generated by the friction is large, a maximum of a remaining error disturbs the suppression of the disk eccentricity.

On the other hand, several methods to compensate the friction are considered. For example, a speed sensor detects a stop status of the actuator for the friction. Then, the stop status of the actuator is released by supplying a large driving force to the actuator. However, in this method, reliability of output signal from the speed sensor at speed "0" timing is low and the speed sensor can not be attached to the actuator because the cost is high and the construction of the tracking servo system is complicated. Furthermore, a direction of the driving force supplied to release from the stop status of the actuator is not determined if a moving direction of the target track is not detected. In short, the stop status of the actuator is not detected by a simple method and such friction compensation is not actually executed in case of tracking control.

SUMMARY OF THE INVENTION

It is an object of the present invention to provide a disk apparatus to stably actuate the head unit to a target track on the disk even if a movement of the head unit is affected by the friction.

According to the present invention, there is provided disk apparatus, comprising: a head means for recording or reproducing information on a disk rotated; an actuator means for positioning said head means at target position of the disk; an error detection means for detecting an error signal between the target position and a position of said head means positioned by said actuator means; a tracking compensation means for outputting a driving signal of said actuator means in order according to the error signal; a decision means for deciding whether an absolute value of a difference between the driving signals is above a threshold; a predetermined value output means for outputting a predetermined value to compensate the driving signal if the absolute value of the difference is above the threshold; and an actuator driving means for driving said actuator means according to the driving signal and the predetermined value.

Further in accordance with the present invention, there is also provided a disk apparatus, comprising: an optical head for forming an optical beam spot on an optical disk rotated; an actuator for positioning said optical head along a track cross direction of the optical disk to follow the optical beam spot to a track of the optical disk; a photo detector for receiving a reflection light of the optical beam spot from the optical disk; an error detection means for detecting a tracking error signal between a target track and the optical beam spot on the optical disk according to the reflection light; a tracking compensation means for outputting a driving signal of said actuator in order according to the tracking error signal; a decision means for deciding whether an absolute value of a difference between the driving signals is above a threshold; a predetermined value output means for outputting a predetermined value to compensate the driving signal if the absolute value of the difference is above the threshold; and an actuator driving means for driving said actuator according to the driving signal and the predetermined value.

Further in accordance with the present invention, there is also provided a disk apparatus, comprising: an optical head for forming an optical beam spot on an optical disk rotated; on actuator for positioning said optical head along a direction perpendicular to an optical disk to form a focus of the optical beam spot on the optical disk; a photo detector for receiving a reflection light of the optical beam spot from the optical disk; an error detection means for detecting a focus error signal between the optical disk and a focus position of the optical beam spot according to the reflection light; a tracking compensation means for outputting a driving signal of said actuator in order according to the focus error signal; a decision means for deciding whether an absolute value of a difference between the driving signals is above a threshold; a predetermined value output means for outputting a predetermined value to compensate the driving signal if the absolute value of the difference is above the threshold; and an actuator driving means for driving said actuator according to the driving signal and the predetermined value.

DETAILED DESCRIPTION OF THE PREFERRED EMBODIMENTS

Figure 1:
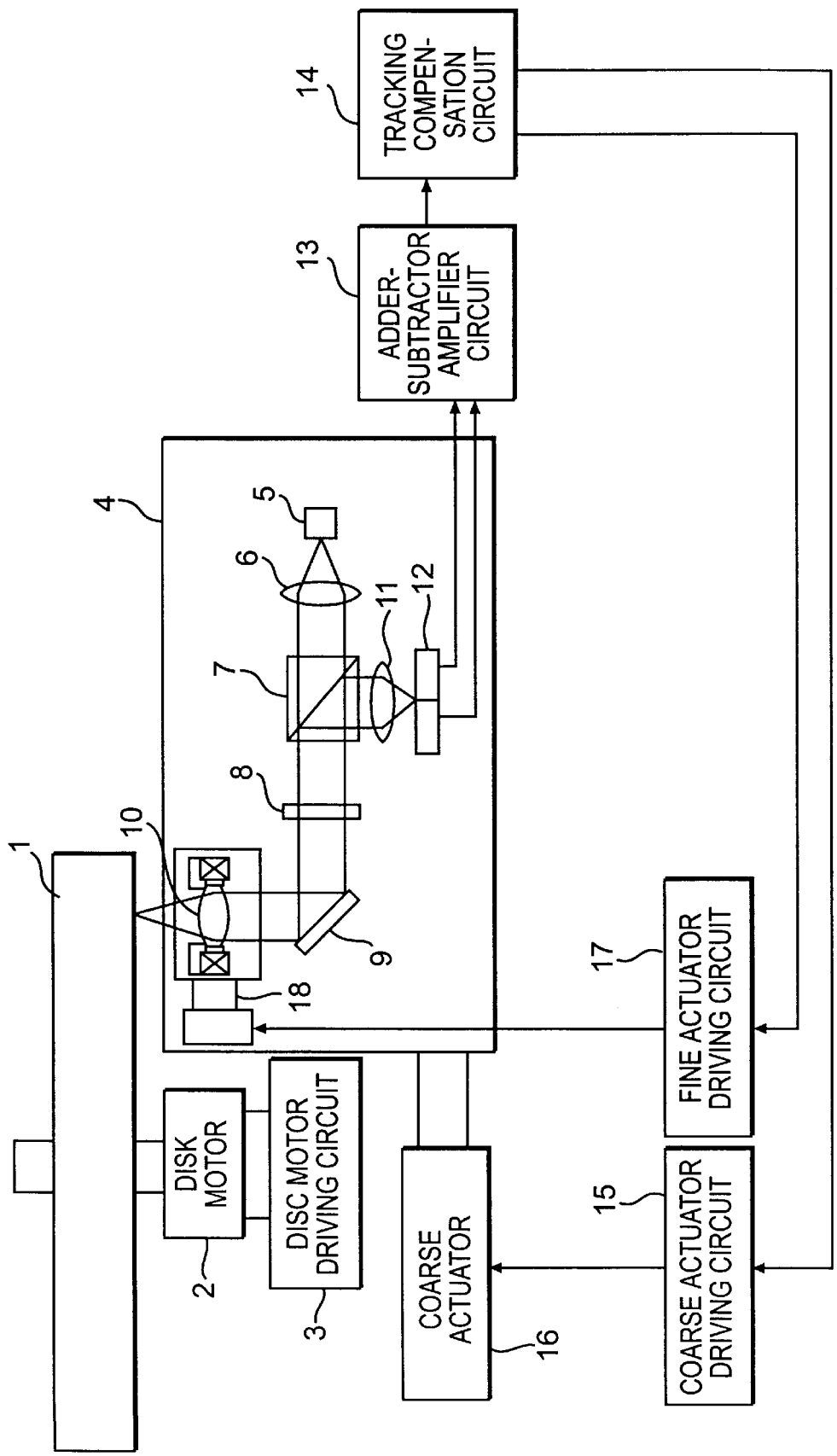
FIG. 1 is a block diagram of the disk apparatus according to the prior art.
Figure 2:
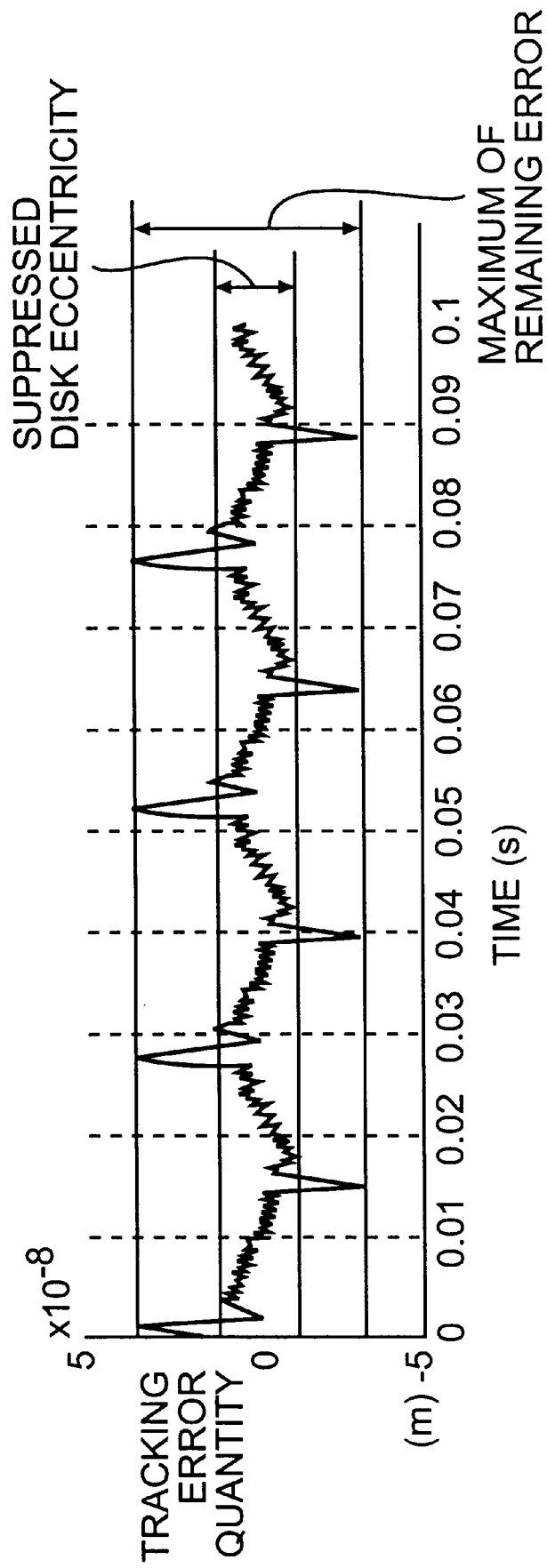
FIG. 2 is a characteristic diagram of effect of the friction for tracking error quantity.
Figure 3:
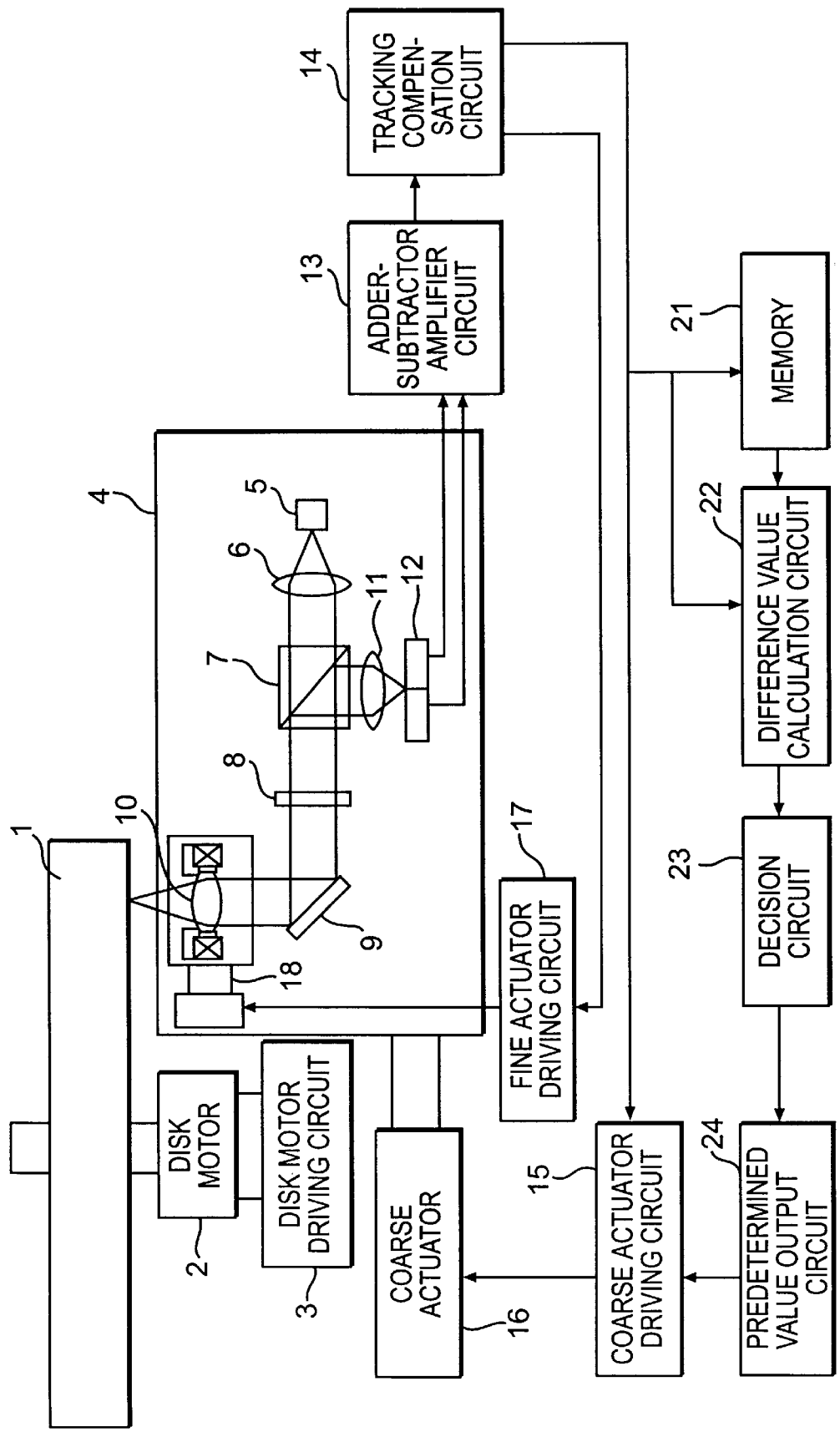
FIG. 3 is a block diagram of the disk apparatus according to a first embodiment of the present invention.

FIG. 3 is a block diagram of the disk apparatus according to the first embodiment of the present invention. A large number of data recording tracks are concentrically or spirally formed on the optical disk 1. The optical disk 1 is rotationally driven by a disk motor driving circuit 3 through a disk motor 2. An optical head 4 records information on the optical disc 1 and reproduces the information from the optical disk 1. In the optical head 4, a light from a semiconductor laser oscillator 5 is converted to parallel light by a collimate lens 6, passes through a beam splitter 7 and λ/4 plate 8, refletced by a mirror 9. Then, a light spot is formed by an objective lens 10 on the optical disk 1 usually rotated. The light reflected by the optical disk 1 is returned from the objective lens 10 to the beam splitter 7. Then, the light reflected by the beam splitter 7 is incident upon a two split photo detector 12. The incident light is converted to photo-electric signal by the two split photo detector 12. The photo-electric signal is converted to a sum signal and a tracking error signal by an adder-subtractor amplifier circuit 13. The tracking error signal generated by the adder-subtractor amplifier circuit 13 is inputted to a tracking compensation circuit 14 and converted to a coarse actuator driving signal and a fine actuator driving signal by filtering calculation. The coarse actuator driving signal is inputted to a coarse actuator driving circuit 15 and the fine actuator driving signal is inputted to a fine actuator driving circuit 17. The coarse actuator driving circuit 15 adds an output signal of the predetermined value output circuit 24 to the coarse actuator driving signal and drives the coarse actuator by the sum signal in order to coarsely position the optical head 4. On the other hand, the fine actuator driving circuit 17 drives the fine actuator 18 by the fine actuator driving signal in order to position the objective lens 10. By this minute driving, the optical beam spot is formed at the target track and the optical head 4 is correctly and finely positioned.

Figure 4:
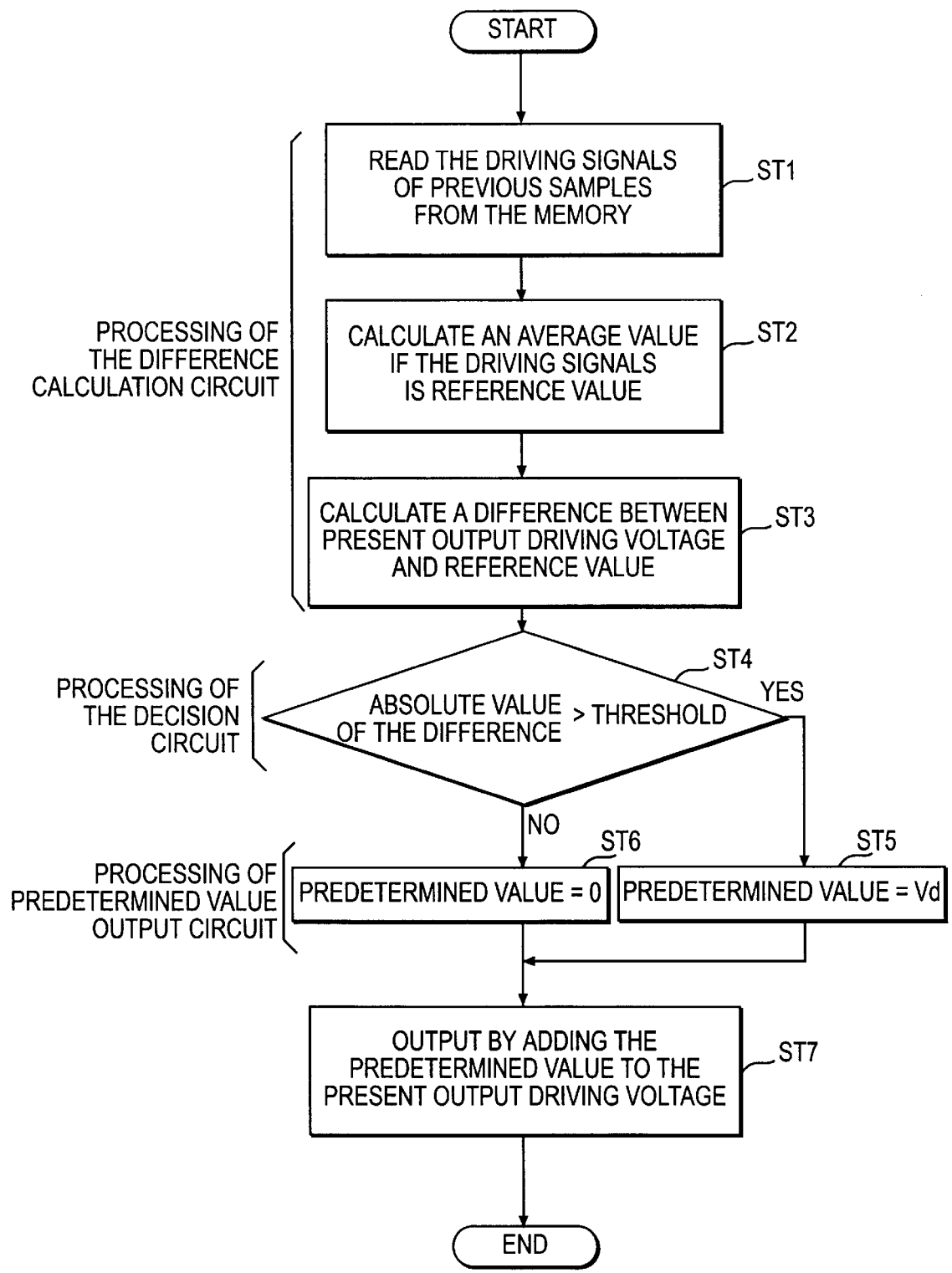
FIG. 4 is a flow chart of processing of a decision circuit in the disc apparatus in FIG. 3.

FIG. 4 is a flow chart of processing of determining value outputted by the predetermined value output circuit 24. The coarse actuator driving signal calculated by the tracking compensation circuit 14 is stored in a memory 21. A difference value calculation circuit 22 reads a plurality of (necessary number) the driving signals previously stored in the memory 21 (ST1) and calculates an average value of the driving signals as a reference value (ST2). On the other hand, the coarse actuator driving signal of present timing is inputted to the difference value caluculation circuit 22. The difference value calculation circuit 22 calculates a difference value between the present driving signal and the reference value (ST3). In short, the driving signal of the one timing is compared with the average of the plurality of the driving signals of past timing. This difference value is inputted to the decision circuit 23. The decision circuit 23 decides whether an absolute value of the difference is above a threshold (ST4). This decision signal and a polarity of the difference is inputted to the predetermined value output circuit 24. The predetermined value output circuit 24 multiplies the polarity by the predetermined value if the decision signal is "1(YES)" (ST5) and outputs this multiplication result (ST7). The predetermined value output circuit 24 outputs "0" as the predetermined value if the decision signal is "0(NO)" (ST6). In case of the decision signal "1", an input to the coarse actuator driving circuit 15 may be changed from the driving signal of the tracking compensation circuit 14 to the predetermined value output circuit 24. In this case, the predetermined value or the multiplication result is inputted the coarse actuator driving circuit 15.

Figure 5:
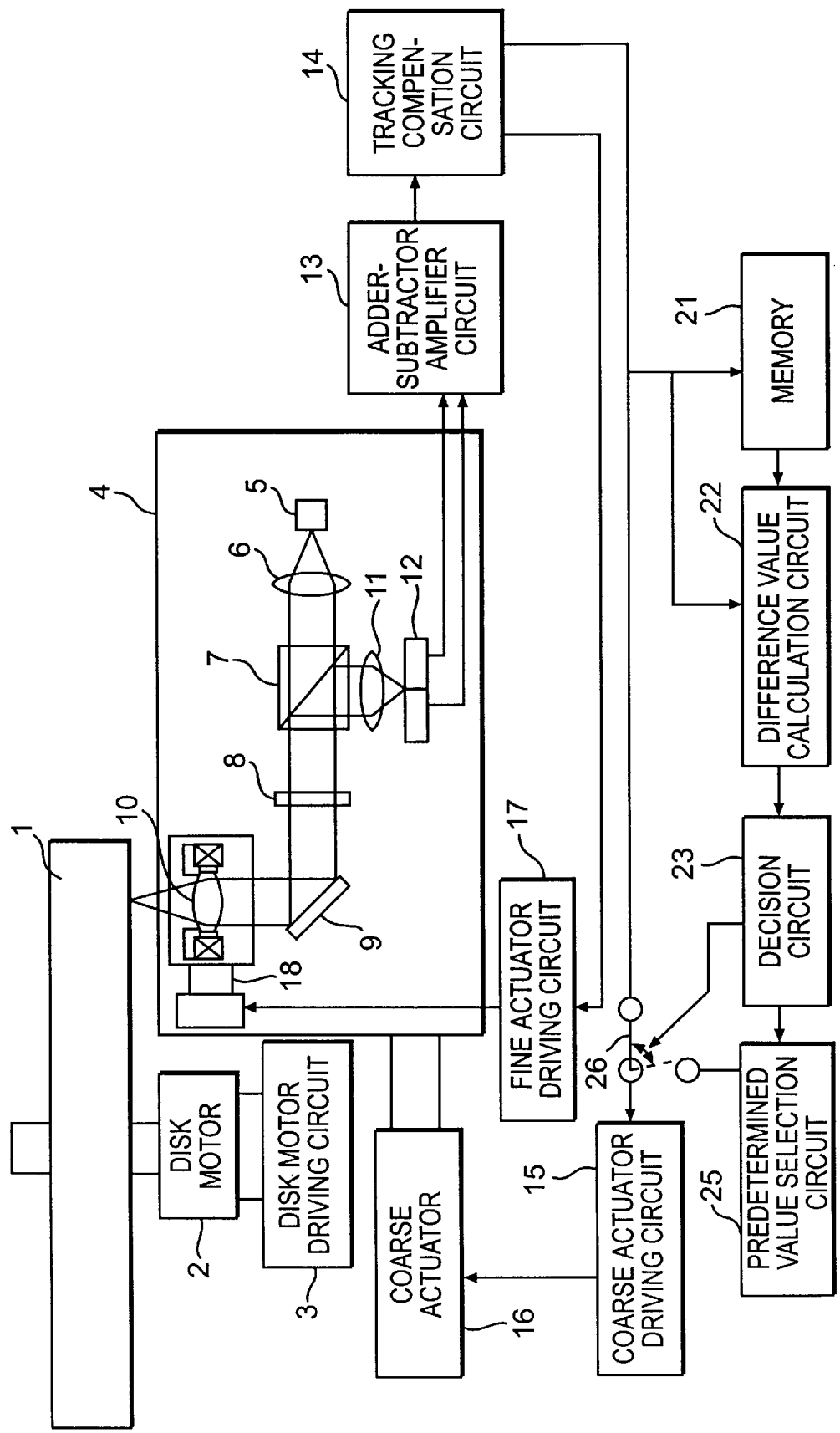
FIG. 5 is a block diagram of the disk apparatus according to a second embodiment of the present invention.

Next, FIG. 5 is a block diagram of the disk apparatus according to the second embodiment of the present invention. In FIG. 5, the decision circuit 23 includes a plurality of the predetermined values (decision result). A predetermined value selection circuit 25 selects one of the predetermined values. The selected one predetermined value is supplied to the coarse actuator driving circuit 15 by a switch 26.

Figures 6A, 6B:
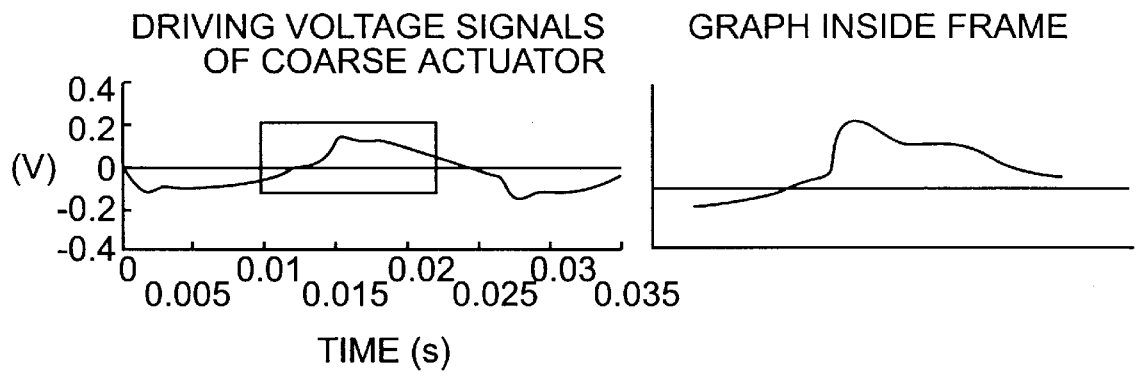
FIGS. 6A, 6B, 6C, 6D, 6E and 6F are characteristic diagrams of calculation methods of the reference value in the disk apparatus.
Figures 6C, 6D:
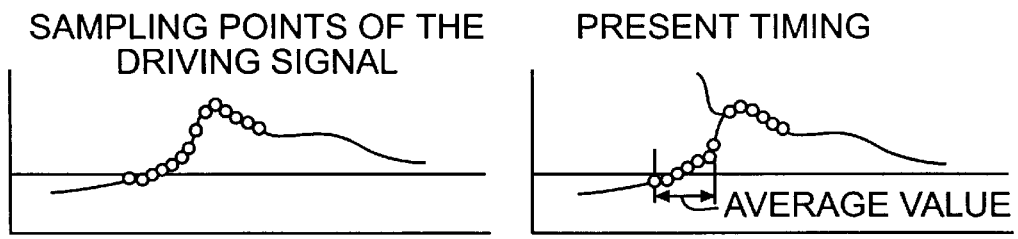
Figures 6E, 6F:
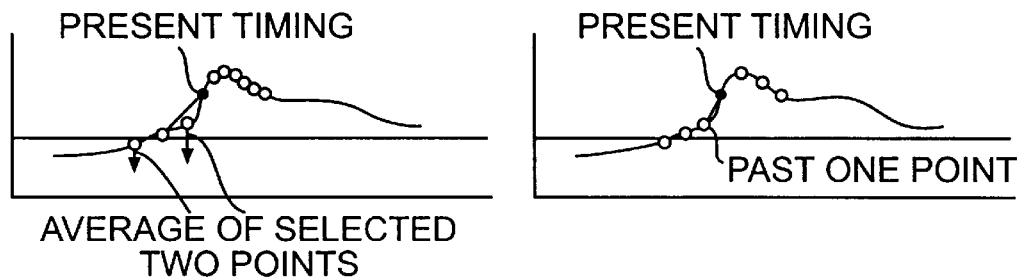

FIGS. 6A–6F show several methods of calculation of the reference value. For example, as shown in FIG. 6D, an average value of several driving signals of past sample may be calculated. As shown in FIG. 6E, an average value of the driving signals of selected two past samples may be calculated. As shown in FIG. 6F, the driving signal of one past sample may be used as the average value. Actually, in order to detect a sudden change of the driving signal, past driving signals neighboring the present timing is used and a minute change by a noise signal must be taken no account.

The threshold of the decision circuit 23 is set to extract only the sudden change of a friction stop eliminating effect of the noise. The predetermined value of the predetermined value output circuit 24 is set as sufficient input to cancel the static friction and not too large value. In short, in case a movement of the actuator is stopped and compensated, the actuator is released from this stop status by adding the predetermined value to the present driving signal. In this case, the predetermined value is determined as a value corresponding to the static friction of the stop status. For example, the value is two times of the static friction force calculated by weight of a moving section.

In the above explanation, the stop status of the actuator is decided by the sudden change of the driving signal. Similar decision is originally possible by using the tracking error signal. In this case, the tracking error signal includes noise elements more than the driving signals. Therefore, this decision is often difficult to be executed. In this place, the tracking error signal is converted to the coarse actuator driving signal by a filter of low frequency passing type. Therefore, in the present invention, the processing of the decision circuit is executed by referring to the coarse actuator driving signal. However, in case effect of high frequency noise does not exist, similar decision is possible by referring to the tracking error signal. In same way, if the positioning is executed by the coarse actuator and the fine actuator as shown in FIG. 3, activation of the fine actuator may be estimated by the driving signal of the fine actuator. In addition to this estimation, activation of the coarse actuator may be estimated by the driving signal of the fine actuator.

As mentioned-above, the decision circuit can decide at least the stop status of the actuator. In case the target position is oscillated and periodically changed by rotation of the disk, a rotation period of the disk is detected by measuring this decision period.

Furthermore, the actuator follows the target track oscillated by rotation period of the disk. A moving direction of the actuator changes periodically. In this case, this direction changes at a timing of decision that the actuator is stopped and a polarity of the direction is estimated by the polarity of the difference value. During a period from a present decision that the actuator is stopped to a next decision, a moving direction of the actuator does not change and the moving direction is detected. In this place, the dynamic friction is generated along the moving direction. Therefore, in order to smoothly drive the actuator, a second predetermined value is added to the present driving signal according to the detected moving direction. In short, if the absolute value of the difference is decided to be above the threshold and a polarity of the difference is different from a polarity of previous difference decided to be above the threshold, the polarity of the moving direction of the coarse actuator is decided to be changed. By using this decision result, the second predetermined value is added to the driving signal of the coarse actuator. The second predetermined value output circuit continuously outputs the second predetermined value corresponding to the polarity for a period from the decision that the absolute value of the difference is above the threshold to next decision. Therefore, the second predetermined value is continuously added to the actuator driving signal. In this way, bad condition of the dynamic friction, whose polarity is changed by the moving direction of the actuator is canceled.

In above explanation, the predetermined value is a value to compensate the static friction in order to release the actuator from a stop status. The second predetermined value is a value to compensate the dynamic friction that affects the actuator during moving.

Figure 7:
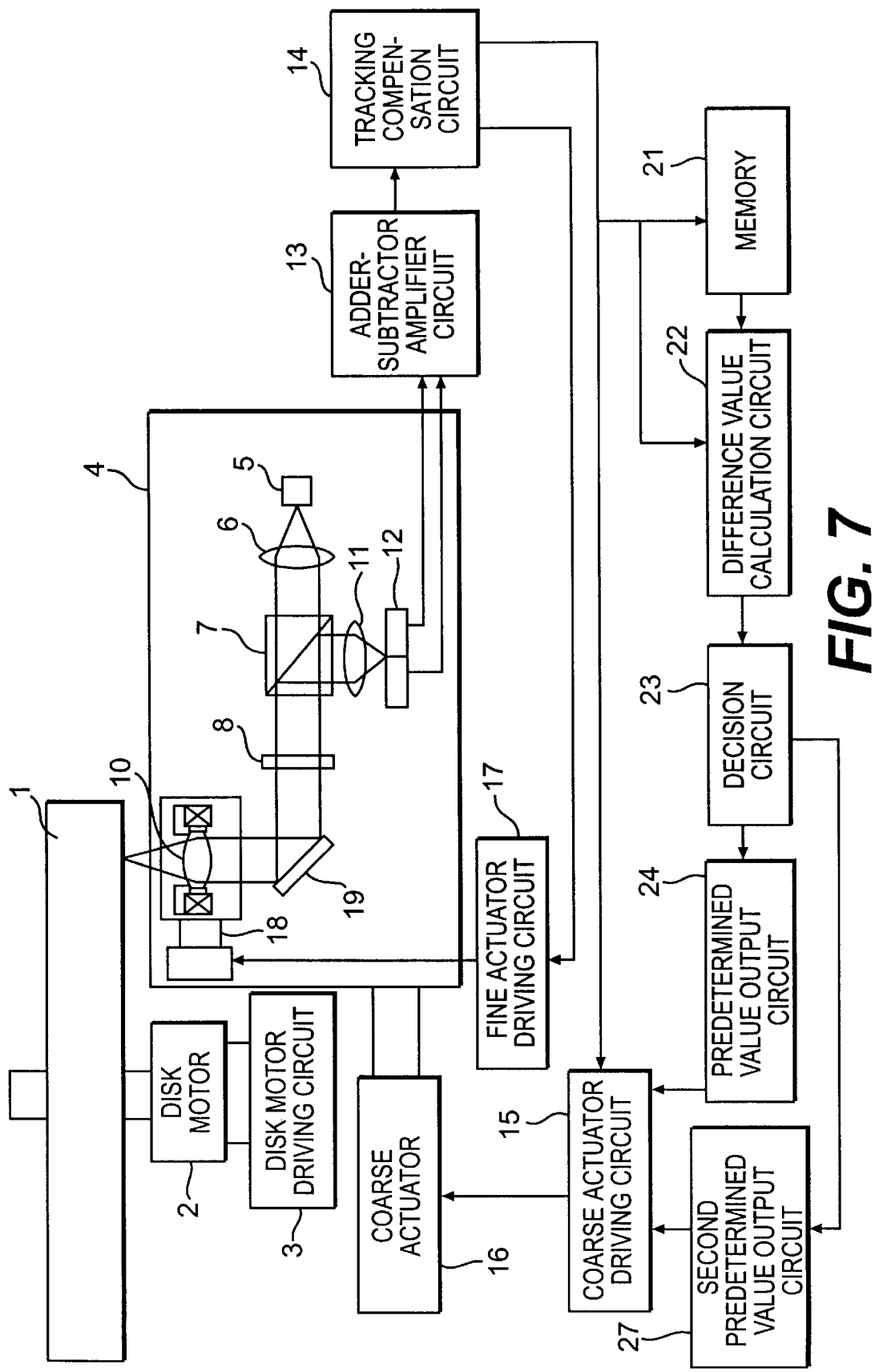
FIG. 7 is a block diagram of the disk apparatus according to a third embodiment of the present invention.
Figures 8A, 8B:
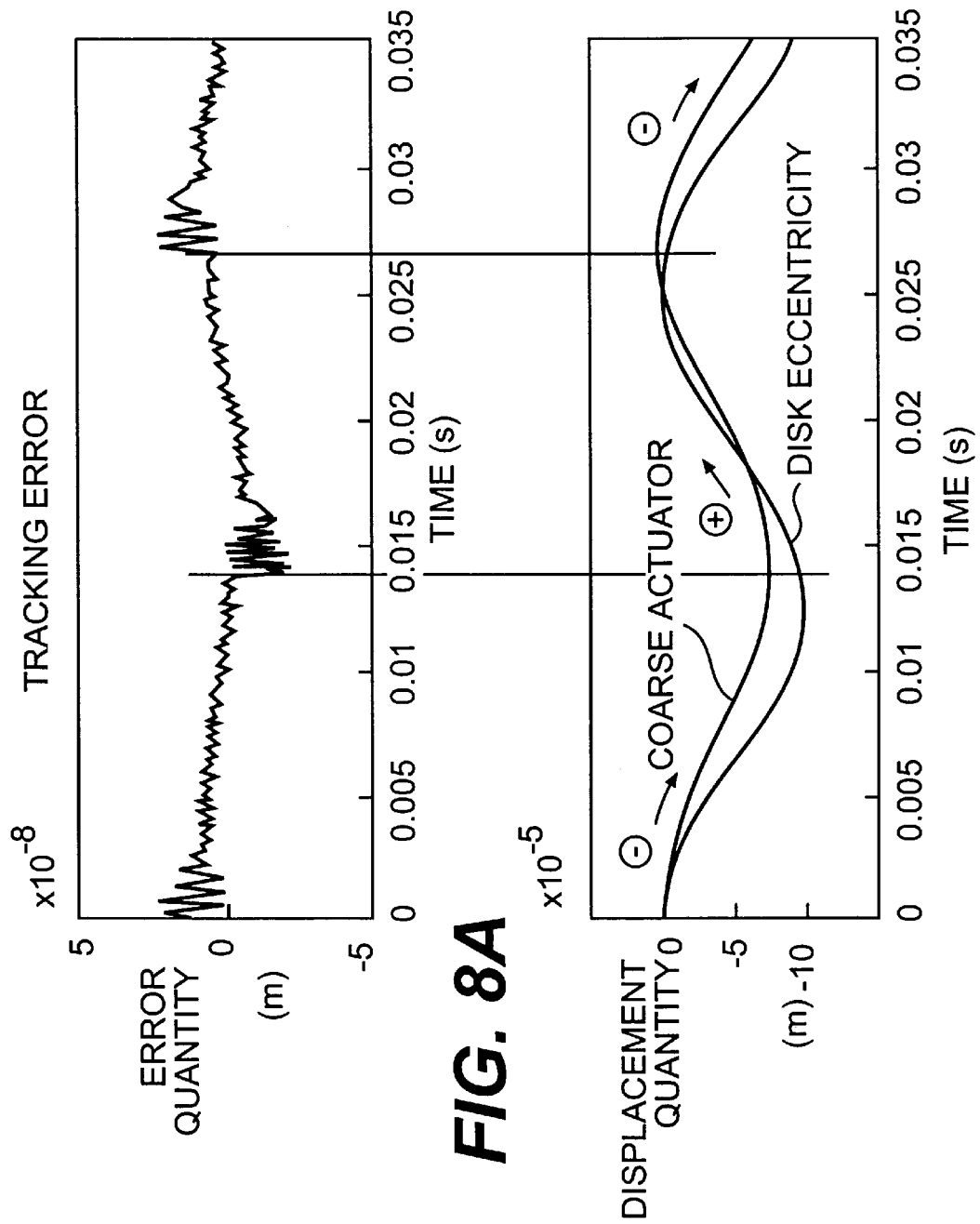
FIGS. 8A and 8B are characteristic diagrams of actuation of the disk apparatus according to the third embodiment of the present invention.
Figure 9:
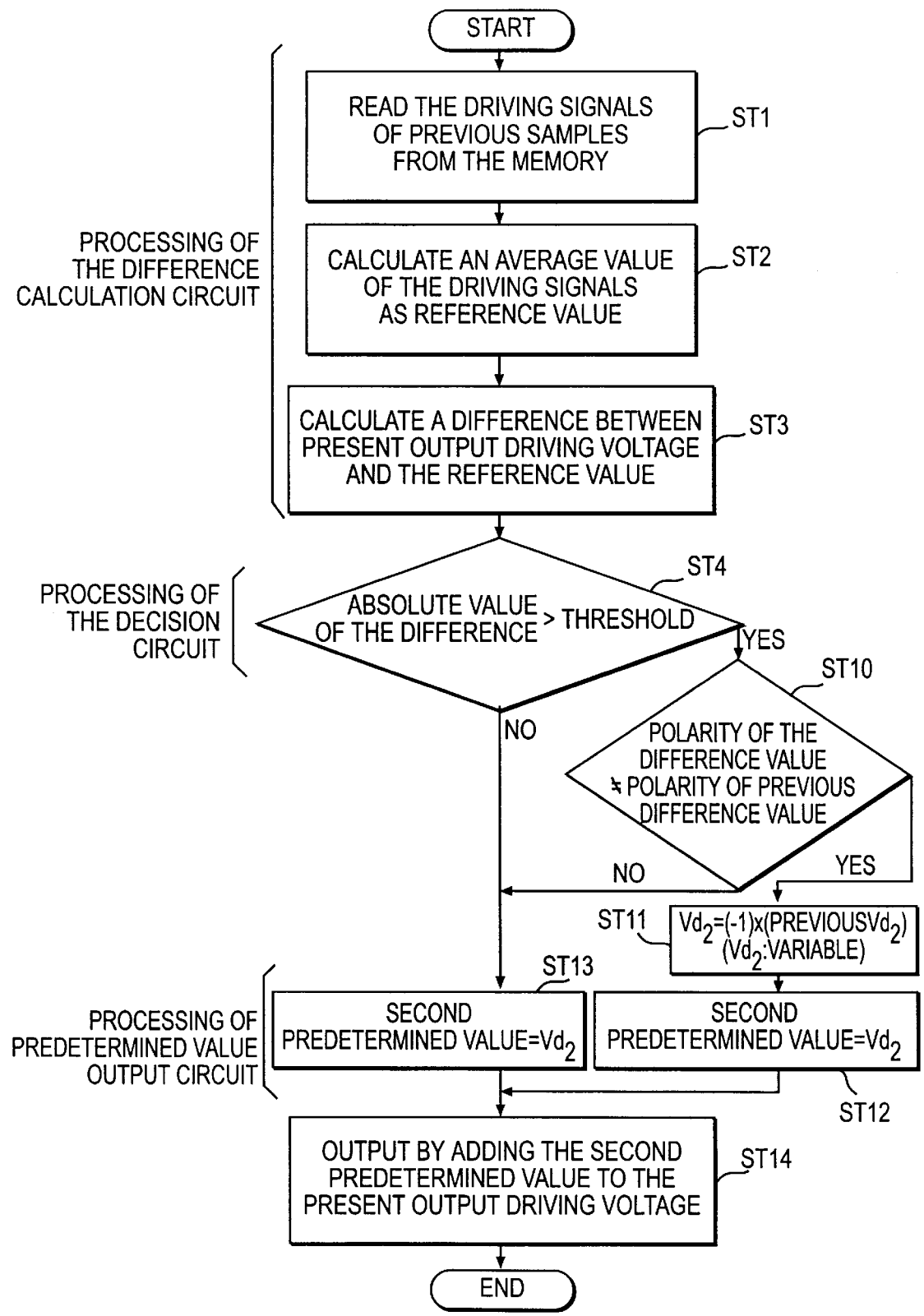
FIG. 9 is a flow chart of processing of the decision circuit in the disk apparatus in FIG. 7.

As a concrete example of above-mentioned construction, FIG. 7 is a block diagram of the disk apparatus according to the third embodiment of the present invention. In FIG. 7, the decision circuit 23 decides whether the absolute value of the difference is above a threshold. This decision result is outputted to the predetermined value output circuit 24. The decision result and the polarity of the difference is outputted to the second predetermined value output circuit 27. Actuation of the disk apparatus of the third embodiment is explained. FIGS. 8A and 8B show relations between the tracking error and the displacement quantity of the coarse actuator. As shown in FIG. 8B, moving speed of the coarse actuator is almost "0" at a timing that the absolute value of the difference is above the threshold. The coarse actuator is driven to follow the target track, which periodically goes and backs on the disk. The polarity of the moving direction changes at a timing that the moving speed is "0" as shown in FIG. 8B. An event that the moving speed is "0" occurs at a half period of rotation period of the disk. The polarity of the difference larger than the threshold is mutually changed every half period. FIG. 9 is a flow chart of processing of the disk apparatus according to the third embodiment. In FIG. 9. steps ST1~ST4 are same as FIG. 4. If the absolute value of the difference (reference value) is above the threshold (ST4), a polarity of the reference value is decided whether it is same as a polarity of previous reference value (ST10). If the polarity of the reference value is different from the polarity of the previous reference value, the second predetermined value corresponding to the polarity of the reference value is determined (ST11) and outputted (ST12). If the polarity of the reference value is same as the polarity of the previous reference value, the second predetermined value corresponding to the polarity of the previous reference value is continuously outputted (ST13). This second predetermined value is determined by the dynamic friction of the coarse actuator. In this way, the second predetermined value is added to the present driving signal of the coarse actuator (ST14).

Figure 10A:
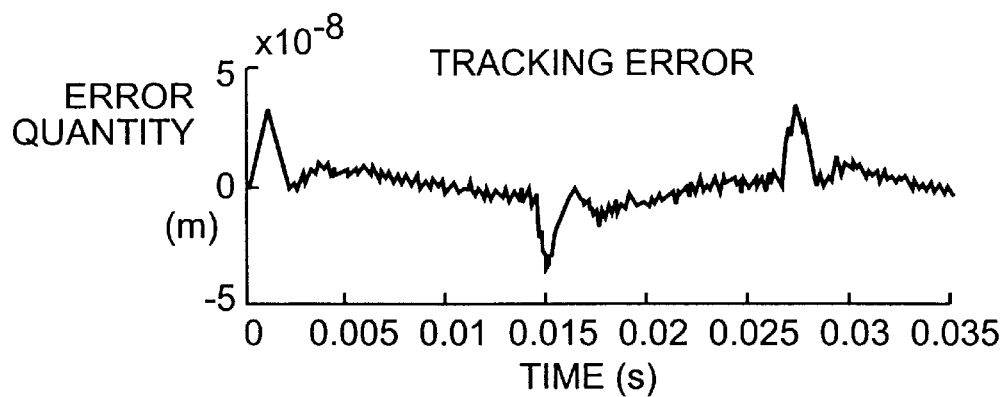
FIGS. 10A, 10B and 10C are characteristic diagrams of tracking control while the tracking is affected by the friction.
Figure 10B:
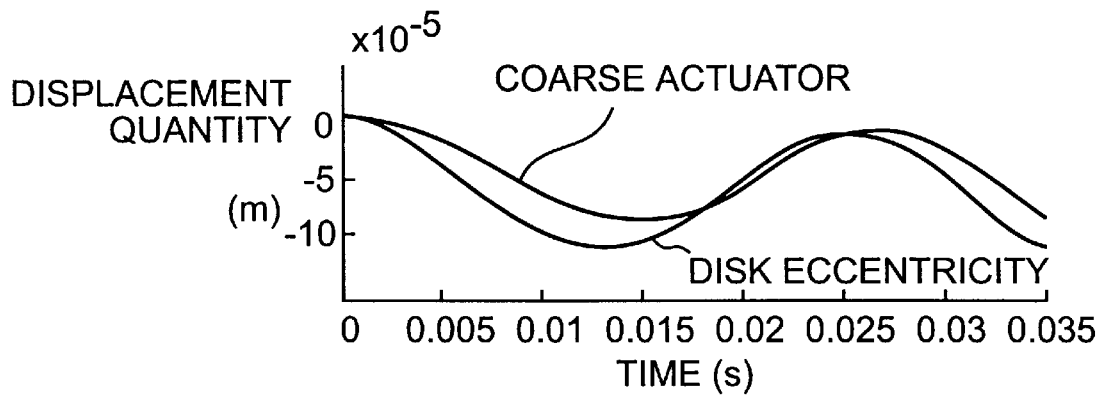
Figure 10C:
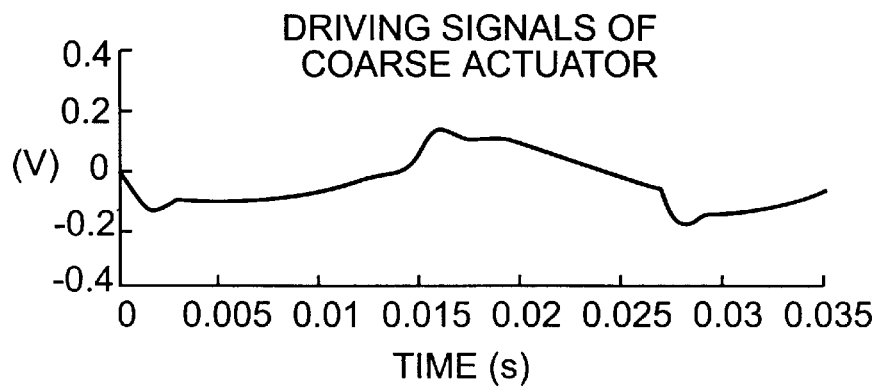

Next, the effect to suppress the tracking error by above-mentioned construction is explained. FIGS. 10A, 10B and 10C show results of tracking control of the disk apparatus according to the prior art. As shown in FIG. 10A, maximum of error quantity is occurred at the unchanged point of displacement of the coarse actuator, i.e., sudden increase of the tracking error generated by the stop status of the coarse actuator. In this case, as shown in FIG. 10C, the driving signal of the coarse actuator is suddenly increased or decreased in proportion to the sudden increase of the tracking error. In the present invention, the stop status of the coarse actuator is detected as the sudden increase or decrease of the tracking error signal.

Figure 11A:
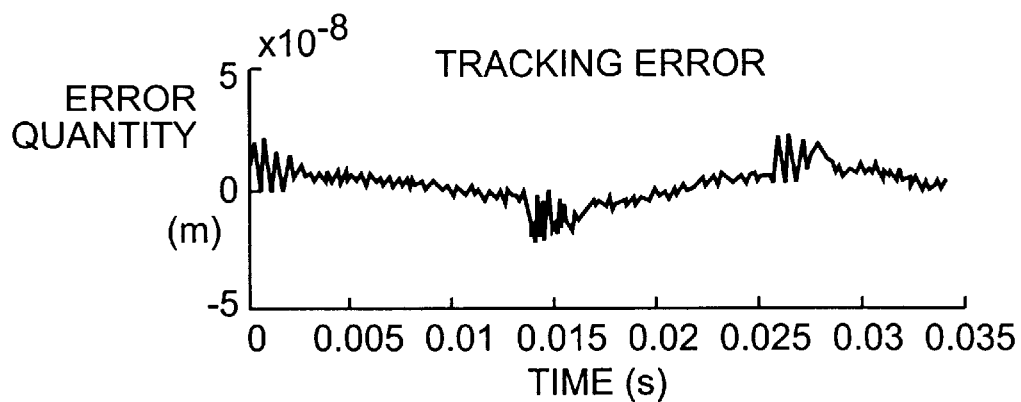
FIGS. 11A, 11B and 11C are characteristic diagrams of tracking control of the present invention while the tracking is affected by the friction.
Figure 11B:
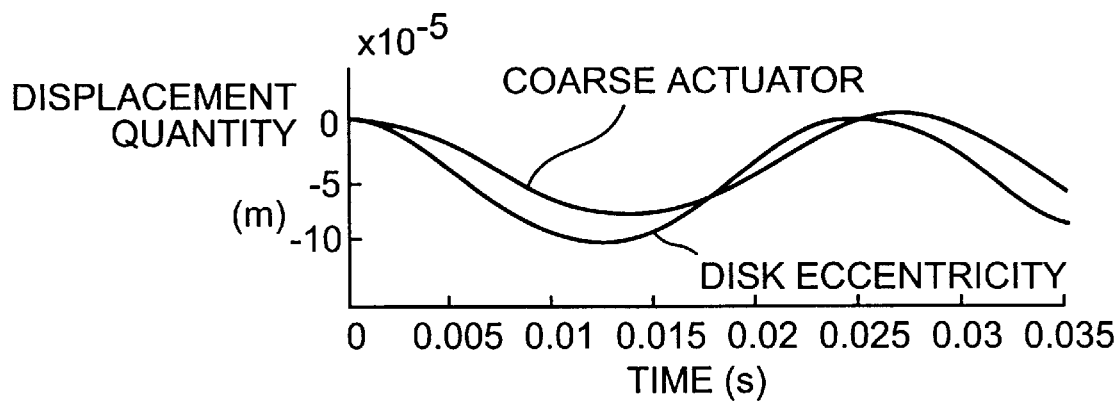
Figure 11C:
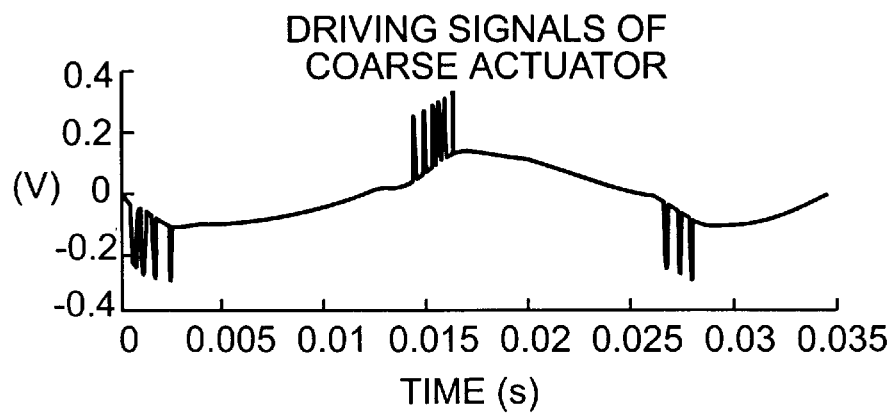

FIGS. 11A, 11B and 11C show results of tracking control of the disk apparatus according to the present invention. As shown in FIG. 11c, the predetermined value is added to the driving signal at a timing that the driving signal is largely changed. Therefore, as shown in FIG. 11A, the tracking error quantity is not suddenly increased and the maximum of the error quantity is smaller than FIG. 10A. In FIG. 11C, the predetermined value is added as pulse signal. However, width of the pulse signal may be suitably set or the predetermined value may be added for a fixed time. In this case, effect of vibratile response by the pulse signal is avoided.

Figure 12A:
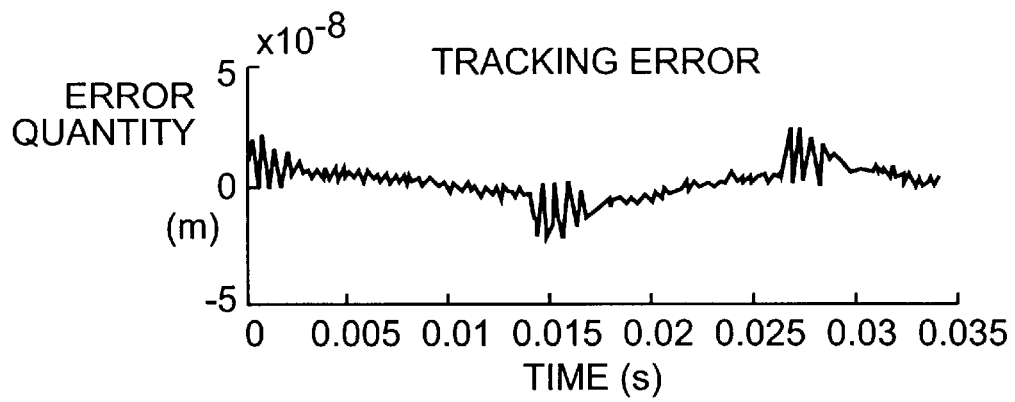
FIGS. 12A, 12B and 12C are another characteristic diagrams of tracking control of the present invention while the tracking is affected by the friction.
Figure 12B:
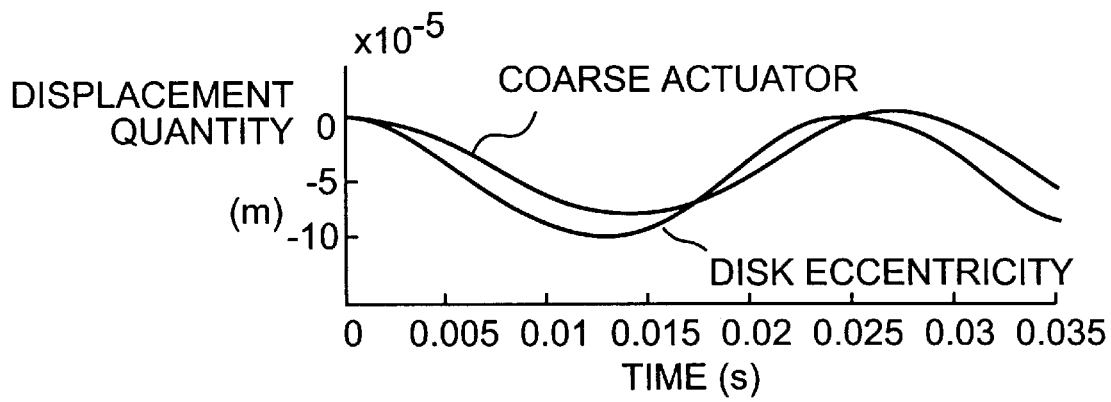
Figure 12C:
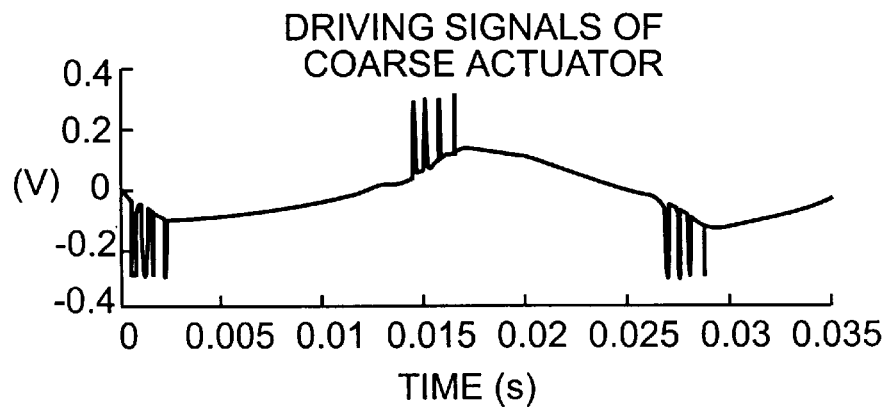

Furthermore, FIGS. 12A, 12B and 12C show results of tracking control of the disk apparatus that the predetermined value itself is outputted as the driving signal. As shown in FIG. 12A, the tracking error includes some vibratile elements. However, effect to suppress the increase of the error quantity is same as FIG. 11A.

By using above-mentioned construction, the decision circuit 23 detects the stop status of the actuator. The predetermind value (additional driving force) is added to the driving signal of the coarse actuator by this detection. In this case, the polarity of the predetermined value is set to correctly follow the moving target point. Therefore, the coarse actuator is released from the stop status. In addition to this effect, the coarse actuator is driven to correctly follow the target track when it moves again.

Figure 13:
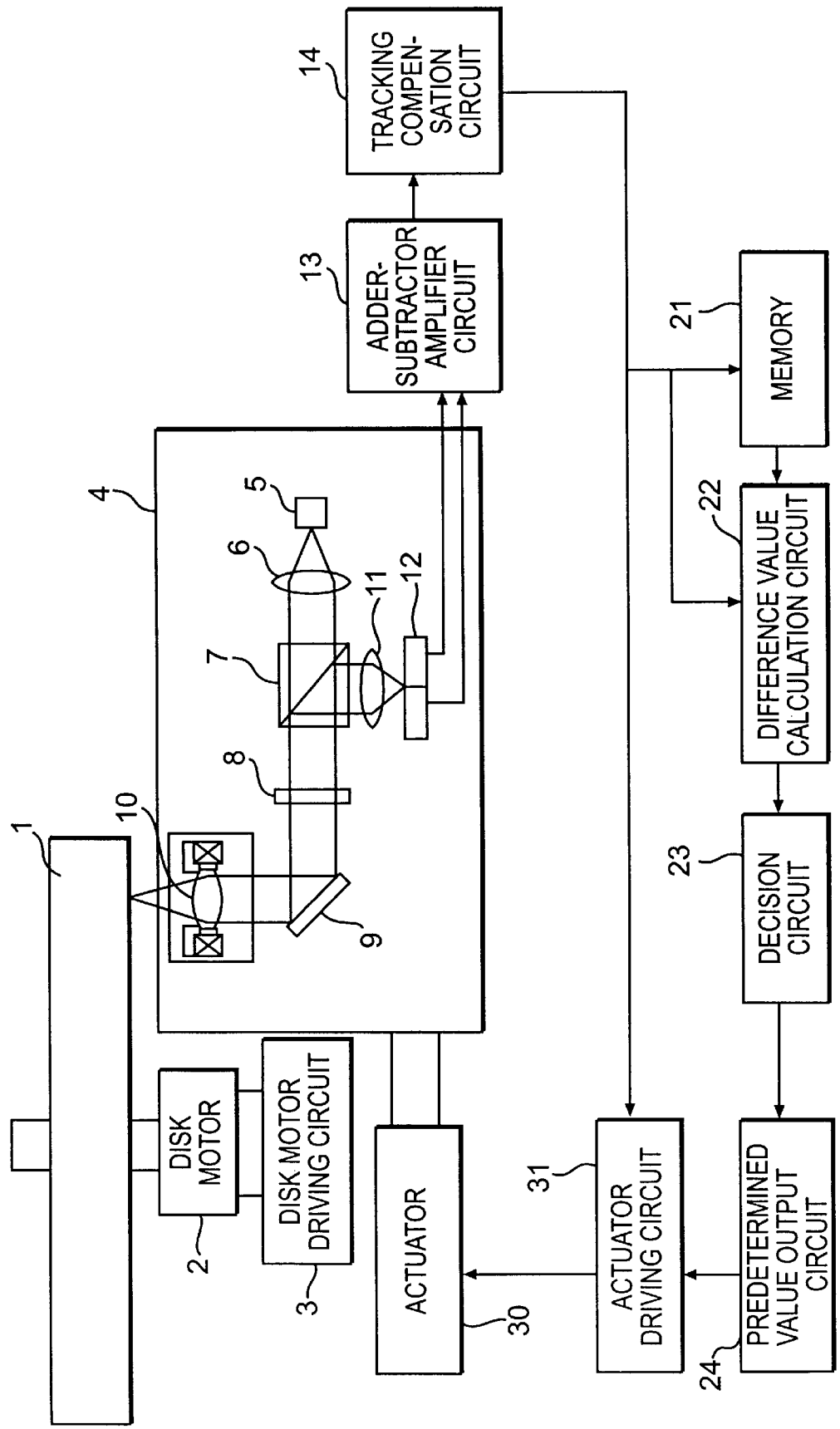
FIG. 13 is a block diagram of the disk apparatus according to a fourth embodiment of the present invention.

The above-mentioned construction is also applied to one actuator for positioning. FIG. 13 is a block diagram of the disk apparatus according to the fourth embodiment in which the one actuator is used for positioning. In FIG. 13, the optical head 4 is driven by the one actuator 30. The actuator driving circuit 31 outputs the driving signal to the actuator 30 according to the predetermined value. In this way, even if the one actuator is only driven, positioning of the optical head for the target track is correctly executed in same way of the first and the second embodiments.

Figure 14:
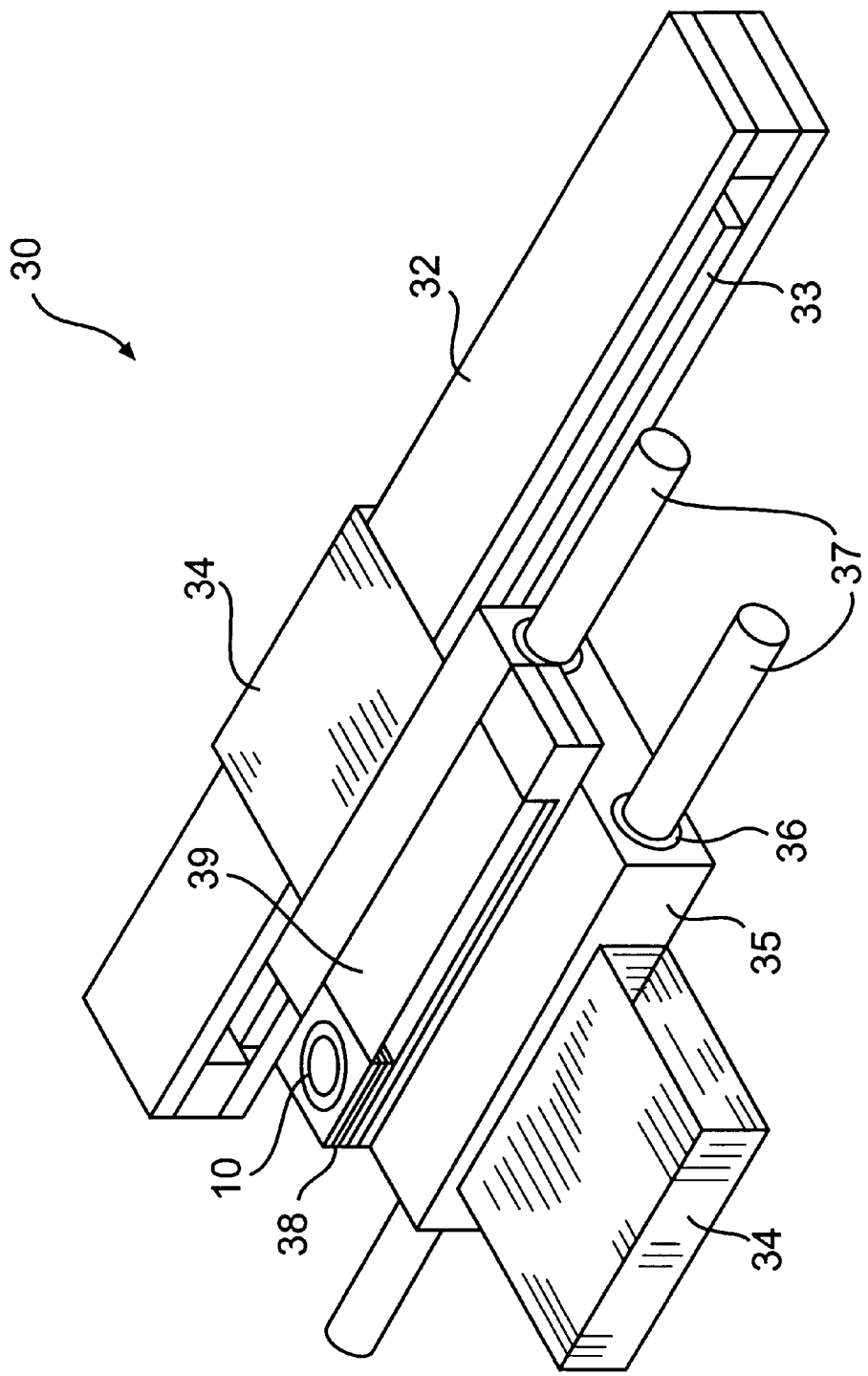
FIG. 14 is a shematic diagram showing construction of the disk apparatus in FIG. 13.

FIG. 14 shows concrete construction of the actuator 30 in FIG. 13. In FIG. 14, a magnet 33 whose upper face is N pole and lower face is S pole is attached to a yoke 32. A pair of tracking coil 34 such as a linear motor are also attached to the yoke 32. A main body of a moving section 35 is located between the pair of tracking coil 34. The main body 35 can go and back along a shaft direction by the bearing section 36 and the guide shaft 37. A focus coil 38 to move the objective lens 10 along a focus direction and two focus leaf springs 39 are set on upper face of the main body 35.

As mentioned-above, in the present invention, the stop status of the actuator is decided by the absolute value of the difference of the driving signals. The driving signals is calculated by the tracking error signal in order. Therefore, when the tracking error signal suddenly increases or decreases, the driving signal is largely changed. In short, while the actuator stops, the absolute value of the difference of the driving signals is continuously a large value. Furthermore, when the stop status of the actuator is detected, the predetermined value is added to the driving signal. Accordingly, the actuator can be early released from the stop status. In this place, the target track continuously moves while the actuator stops. When the actuator begins to move, the actuator must be driven to correctly follow the target track. In the present invention, the polarity of the predetermined value is determined by the polarity of the difference. Therefore, the actuator is fastly driven along correct direction on the disk.

Figure 15:
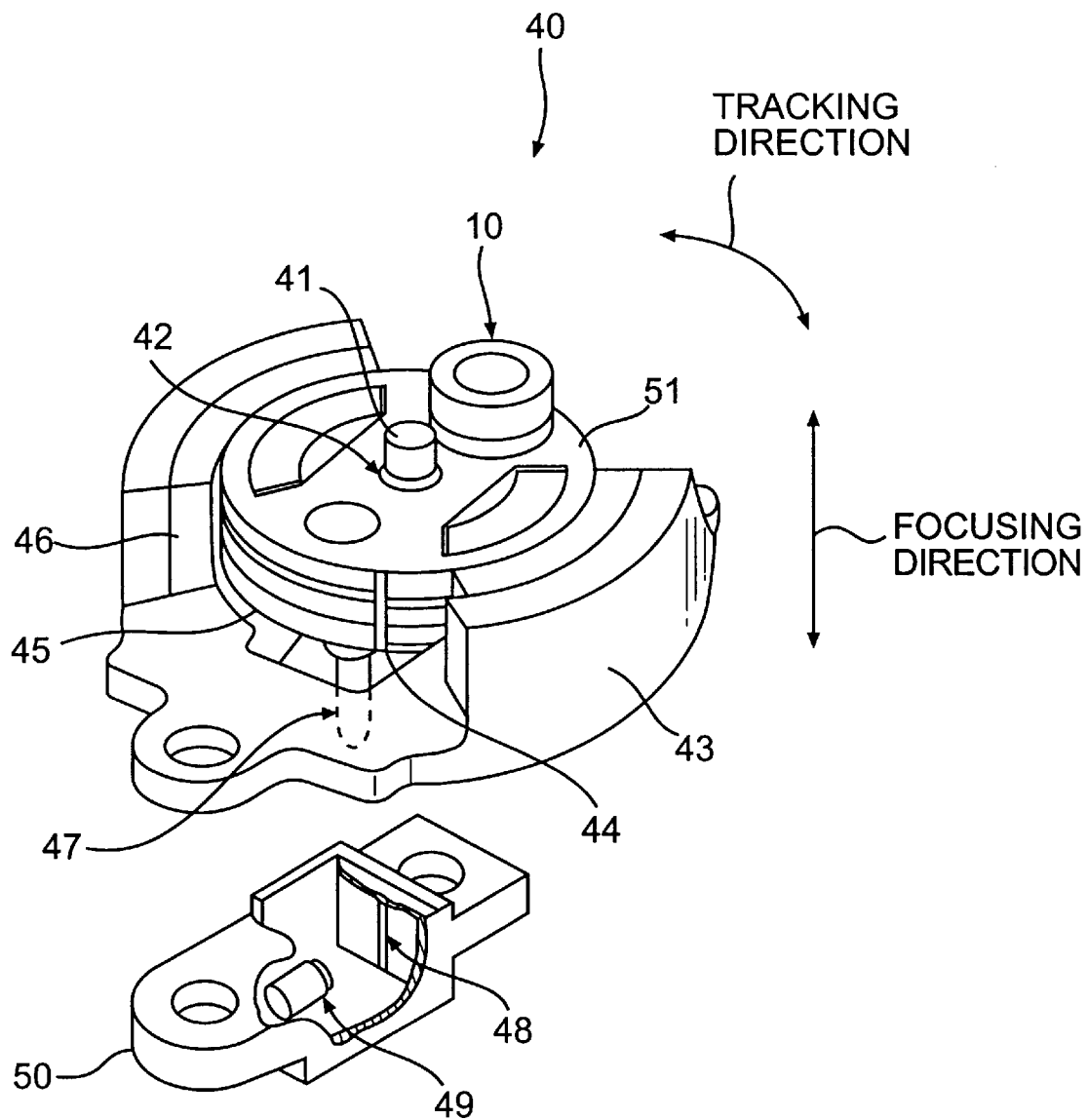
FIG. 15 is a schematic diagram showing a focus actuator in the disk apparatus according to the present invention.

In the disk apparatus of the first, second, third, fourth embodiments, axis sliding friction for the movement along the tracking direction is avoided. However, the present invention is applied to the axis sliding friction along a focusing direction. FIG. 15 shows schematic diagram of a lens actuator 40 of axis sliding type movable along focusing direction. In FIG. 15, the moving section moves along the focusing direction guided by the shaft 41. In case of focus driving, the friction between the guide shaft 41 and the bearing 42 is avoided by the present invention. The moving section 51 including the objective lens 10 is movably supported along the focusing direction by a shaft 41 and rotates as a center of the shaft 41 along the tracking direction. As a construction of the magnetic circuit, a tracking coil 44 and a focusing coil 45 are attached to the moving section 51 and a permanent magnet 46 is attached to a fixed side 43 to which the shaft 41 is fixed. A lens position sensor 50 including a pin 47 is set to the moving section 51. The lens position sensor 50 prepares two split photo detectors 48 and a light emitting diode (LED) 49.

Figure 16A:
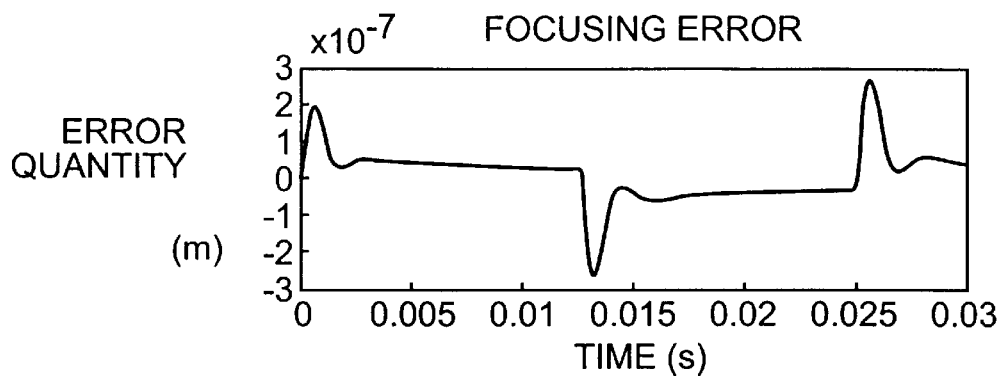
FIGS. 16A, 16B and 16C are characteristic diagrams showing a focus error characteristics in the disk apparatus.
Figure 16B:
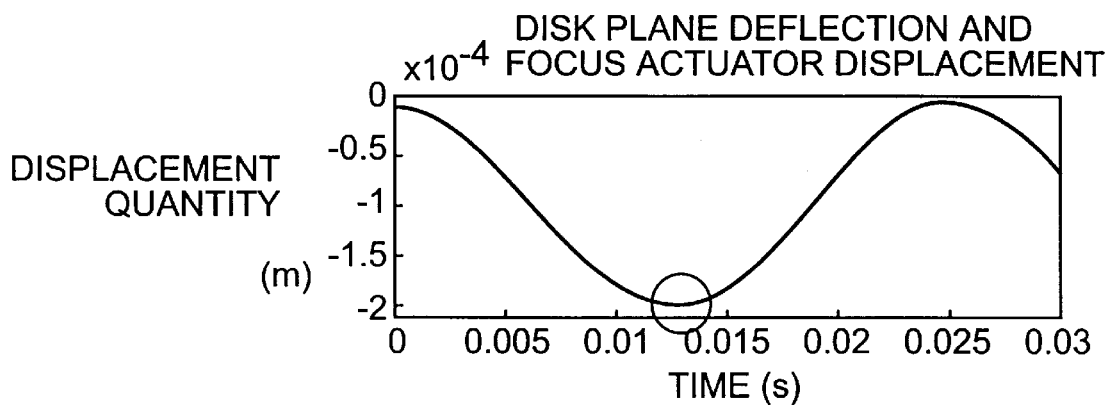
Figure 16C:
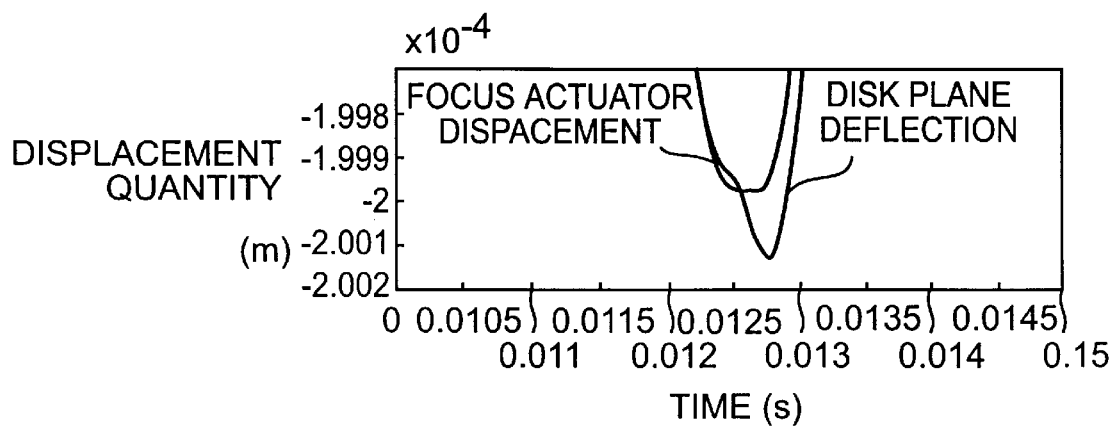

In this place, FIGS. 16A, 16B and 16C show focus servo simulations of the focus actuator 40. In same way of the lens actuator of shaft sliding type, in case the friction is generated by movement of the moving section 51 along the focusing direction, a focusing error signal suddenly changes as shown in FIG. 16A. FIG. 16B shows a focus actuator displacement in case of disk plane deflection. In FIG. 16B, the focus actuator 40 apparently follows the disk plane deflection because these two signal waves overlap. However, in area which moving speed of the focus actuator is almost "0" (a circle area in FIG. 16B), a following error (displacement quantity) between the focus actuator displacement and the disk plane deflection greatly increases as shown in FIG. 16C. This causes sudden increase of the focusing error.

Figure 17:
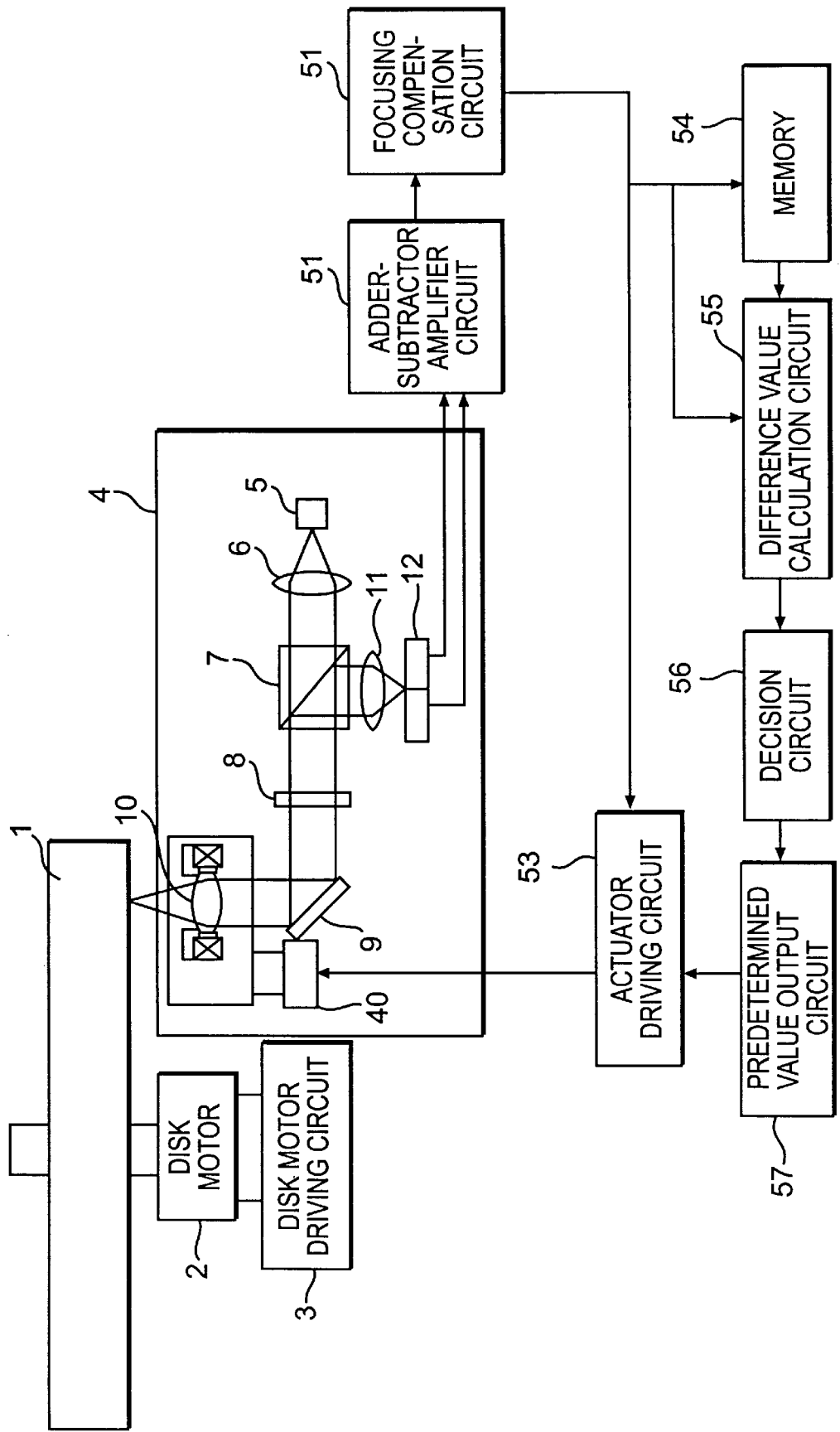
FIG. 17 is a block diagram of the disk apparatus according to a fifth embodiment of the present invention.

As the disk apparatus to avoid the axis sliding friction, the fifth embodiment of the present invention is explained. The fifth embodiment effectively reduces the effect of this friction along the focusing direction. FIG. 17 shows a block diagram of the disk apparatus as focusing control system according to the fifth embodiment. In the tracking control system, two split photo detector 12 is used. However, in the focusing control system in FIG. 17, four split photo detector 12 is used. A light is converted to photoelectrical signal by the four split photo detector 12. The photoelectrical signal is converted to focus error signal by the adder-subtractor amplifier circuit 51. The focus error signal is inputted to the focusing compensation circuit 52 and converted to focus actuator driving signal by amplification and filtering. The focus actuator driving signal is inputted to the actuator driving circuit 53. The actuator driving circuit 53 drives the focus actuator 40 to move the optical head 4 including the objective lens 10. The optical head 4 (objective lens) is positioned to correctly form an optical spot on the optical disk 1. The focusing activation is same as the tracking activation of FIG. 3. On the other hand, the focus actuator driving signal is inputted to the difference value calculation circuit 55 and stored in the memory 54. The difference value calculation circuit 55 reads the driving signals of plural samples previously stored in the memory 54, calculates an average of the driving signals, and calculates the difference between the average and the present focus actuator driving signal. The difference is inputted to the decision circuit 56. If the absolute value of the difference is above the threshold, the predetermined value output circuit 57 outputs the predetermined value of polarity of the difference to the actuator driving circuit 53.

In the fifth embodiment, effect of the friction generated by the focusing control is avoided and smooth focusing control is realized. In same way of the tracking control, the moving direction of the actuator is detected by change of the polarity of the difference. Accordingly, compensation of the dynamic friction may be executed by the second predetermined value output section and rotation period of the disk may be detected by the change of the polarity.

The present invention is applied to two-layer disk used in DVD (Digital Versatile Disk) apparatus. As mentioned-above, even if the friction is generated by positioning along focus direction, the moving direction of the focus moving section is detected. Therefore, if the driving force to compensate the friction is previously supplied to the focus moving section, effect of the friction force is greatly reduced.

In optical disk including a plurality of recording layer along the focus direction such as DVD, movement, which the optical beam spot jumps among plural layers, is frequently generated in case of recording and/or reproducing. In this case, the jump movement among the plural layers is not stably executed because of the friction. However, if a generation direction of the friction force is detected according to the present invention, the jump movement is stably executed by suppressing the effect of the friction.

Furthermore, in the disk apparatus of the present invention, in case the stop status of the actuator is decided, the predetermined value may be supplied to the driving signals of the fine actuator. In this case, the fine actuator is driven instead of the coarse actuator to suppress sudden increase of the tracking error.

Furthermore, both the coarse actuator and the fine actuator may be driven to effectively reduce the tracking error.

What is claimed is:

1. A disk apparatus, comprising:
   an head means for recording or reproducing information on a disk rotated;
   an actuator means for positioning said head means at target position of the disk;
   an error detection means for detecting an error signal between the target position and a position of said head means positioned by said actuator means;
   a tracking compensation means for outputting a driving signal of said actuator means in order according to the error signal;
   a memory means for storing a plurality of the driving signals outputted by said tracking compensation means in order;
   a difference value calculation means for reading the driving signals previously stored from said memory means, for calculating an average of the driving signals read as a reference value, and for calculating the difference between the average and a present driving signal
   a decision means for deciding whether an absolute value of a difference between the driving signals is above a threshold;
   a predetermined value output means for outputting a predetermined value to compensate the driving signal if the absolute value of the difference is above the threshold; and
   an actuator driving means for driving said actuator means according to the driving signal and the predetermined value wherein said actuator driving means calculates the sum of the driving signal and the predetermined value, and drives said actuator means by using the sum to compensate a static friction of said actuator means.

2. The disk apparatus according to claim 1, wherein said decision means decides whether a polarity of the difference is same as a polarity of previous difference whenever the absolute value of the difference is above the threshold.

3. The disk apparatus according to claim 2, further comprising a second predetermined output means for outputting a second predetermined value corresponding to the polarity if the polarity of the difference is different from a polarity of the previous difference.

4. The disk apparatus according to claim 3, wherein said actuator driving means calculates sum of the driving signal and the second predetermined value, and drives said actuator means by using the sum to compensate a dynamic friction of said actuator means.

5. The disk apparatus according to claim 3, wherein said second predetermined output means continuously outputs the second predetermined value corresponding to the polarity till said decision means decides whether a polarity of next difference is same as the polarity of the difference as a next decision.

6. The disk apparatus according to claim 1, wherein said actuator means is comprised of a coarse actuator and a fine actuator, and
   wherein said actuator driving means drives the coarse actuator by using a sum of the driving signal and the predetermined value.

7. The disk apparatus according to claim 1, wherein said predetermined value output means does not output the predetermined value if the absolute value of the difference is not above the threshold.

8. A disk apparatus, comprising:
   an optical head for forming an optical beam spot on an optical disk rotated;
   an actuator for positioning said optical head along a track cross direction of the optical disk to follow the optical beam spot to a track of the optical disk;
   a photo detector for receiving a reflection light of the optical beam spot from the optical disk;
   an error detection means for detecting a tracking error signal between a target track and the optical beam spot on the optical disk according to the reflecting light;
   a tracking compensation means for outputting a driving signal of said actuator in order according to the tracking error signal;
   a decision means for deciding whether an absolute value of a difference between the driving signals is above a threshold;
   a predetermined value output means for outputting a predetermined value to compensate the driving signal if the absolute value of the difference is above the threshold; and
   an actuator driving means for driving said actuator according to the driving signal and the predetermined value wherein said actuator driving means calculates the sum of the driving signal and the predetermined value, and drives said actuator means by using the sum to compensate a static friction of said actuator means.

9. A disk apparatus, comprising:

an optical head for forming an optical beam spot on an optical disk rotated;

an actuator for positioning said optical head along a direction perpendicular to an optical disk surface to form a focus of the optical beam spot on the optical disk;

a photo detector for receiving a reflection light of the optical beam spot from the optical disk;

an error detection means for detecting a focus error signal between the optical disk and a focus position of the optical beam spot according to the reflection light;

a tracking compensation means for outputting a driving signal of said actuator n order according to the focus error signal;

a decision means for deciding whether an absolute value of a difference between the driving signals is above a threshold;

a predetermined value output means for outputting a predetermined value to compensate the driving signal if the absolute value of the difference is above the threshold; and an actuator driving means for driving said actuator according to the driving signal and the predetermined value wherein said actuator driving means calculates the sum of the driving signal and the predetermined value, and drives said actuator means by using the sum to compensate a static friction of said actuator means.

* * * * *